Oct. 12, 1965 J. L. RHODES ETAL Re. 25,879

DISPENSING VALVES HAVING A STEM BY-PASS FOR GASSING

Original Filed March 5, 1959

INVENTORS.
JAMES L. RHODES &
RICHARD C. HUG
BY
Jerome A. Gross,
ATTORNEY

United States Patent Office

Re. 25,879
Reissued Oct. 12, 1965

25,879

DISPENSING VALVES HAVING A STEM BY-PASS FOR GASSING

James L. Rhodes, University City, and Richard C. Hug, St. Louis, Mo., assignors, by mesne assignments, to the Clayton Corporation of Delaware, a corporation of Delaware Original No. 3,081,916, dated Mar. 19, 1963, Ser. No. 797,388, Mar. 5, 1959. Application for reissue Dec. 16, 1964, Ser. No. 432,036
5 Claims. (Cl. 222—394)

Matter enclosed in heavy brackets [ ] appears in the original patent but forms no part of this reissue specification; matter printed in italics indicates the additions made by reissue.

The present invention relates to dispensing valves for gas pressure dispensing containers, and applies particularly to the type of valves through which gas is inserted into the container after the dispensing valve itself has been sealedly secured to the container.

For controlled flow in dispensing, the dispensing passages through such valves are frequently made so small, or with such constrictions, that the necessary quantity of gas cannot be forced therethrough during a reasonably short time.

One of the objects of the present invention is to minimize the time required for gassing containers through their dispensing valves. Another object is to provide a dispensing valve construction including such flow-constricting dispensing passages as are suitable for a variety of uses, with or without dip-tubes; which may be quickly gassed, and yet will permit easy dispensing operations with desired flow characteristics. A still further object is to provide a valve through which gas may be quickly inserted, in a mass-production operation, and which will thereafter close itself positively and securely, without leakage; for any substantial leakage in even a fraction of the percent of such containers would be commercially unsatisfactory.

The foregoing objects, and others which will be apparent, are achieved in the present invention and the embodiments shown in the drawings, in which.

Both of the valve embodiments illustrated will be seen to include, generally, rigid tubular stems each having an imperforate head, a port into the stem adjacent and axially outward of the head, a cylindrical sealing portion on the radially outer surface of the stem adjacent to and axially outward of the ports, a gas filling by-pass formed into the outer surface of the stem outwardly adjacent to the cylindrical portion; a manipulative portion outward of the gas filling by-pass portion thereof; an axially inward-presented annular face, and resilient means for exerting an axially outward force thereagainst.

Figure 1:
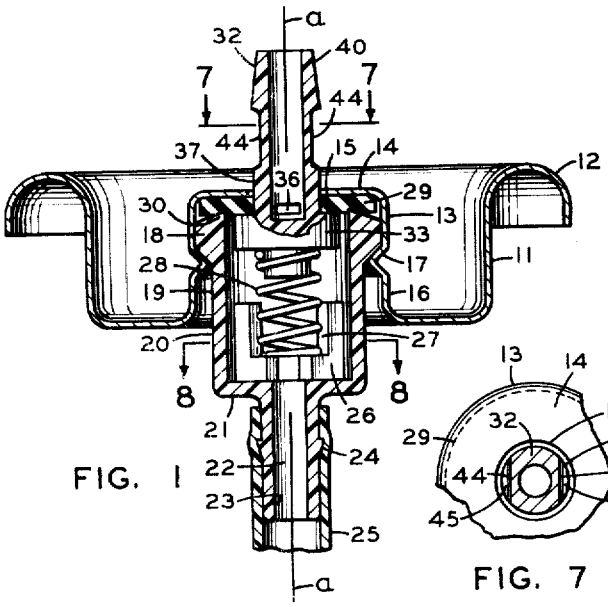
FIGURE 1 is a vertical sectional view through a valve embodying the present invention, mounted in the mounting cup of a container, and in closed position.
Figure 2:
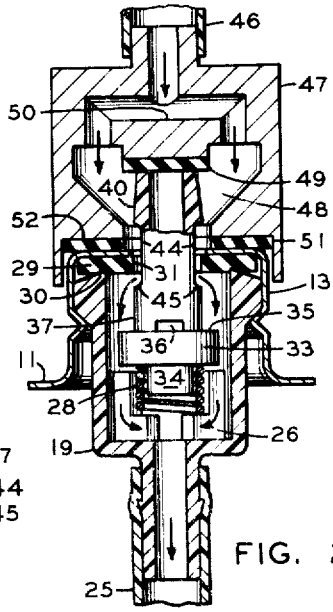
FIGURE 2 is a sectional view of such valve shown pressed downward by a gassing head from which gas is flowing around the outside of the spout and into the nipple of the valve.
Figure 3:
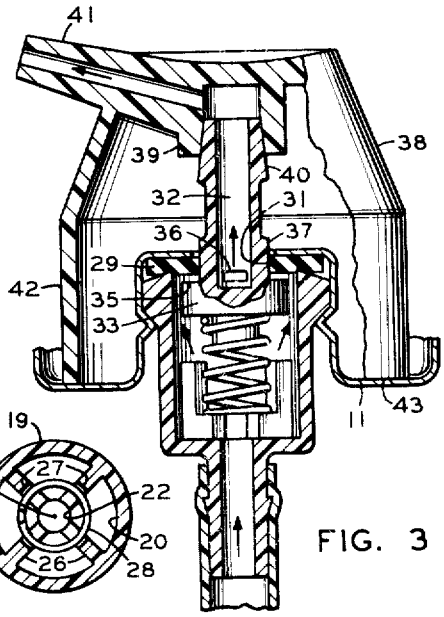
FIGURE 3 is a sectional view of the valve of FIGURE 1 shown with an actuator cap applied to the valve stem and pressed downward, to dispense the container contents.

Thus, in the embodiment shown in FIGURES 1, 2 and 3, to be applied to a single-use dispensing container of the pressure-can type, we furnish a mounting cup generally designated 11 having an outer annular rim 12 which mounts sealedly to the mouth of such a can-type pressure dispenser. Raised in the middle portion of the mounting cup 11 is a dome 13 having a flat top wall 14 including a central circular aperture 15, of sufficient diameter to accommodate, with clearance, the valve spout 32, hereafter described. The dome has a nearly cylindrical side wall 16. At the time of assembly of the valve part as hereinafter described, the side wall 16 is spun with an annular groove 17 whereby to hold the upper, radially outward-extending rim 18 of a preferably plastic nipple 19. The nipple 19 provides a chamber for the flow of the substance to be dispensed, and includes a hollow cylindrical wall portion 20, topped by the outwardly-extending rim 18 and joining a lower nipple wall 21 having a central opening 22, from which extends a downwardly-projecting tubular portion 23 having an outwardly-formed ridge 24. Onto the tubular portion 23 and held with added security by the ridge 24 is a preferably flexible plastic dip-tube 25, which extends downwardly a sufficient length to bring its lower end opening (not shown) to near the bottom of the can in which the mounting cup 11 is mounted.

Figure 8:
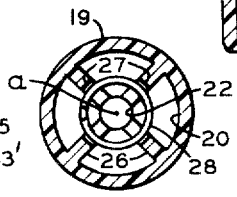
FIGURE 8 is a sectional view taken along line 8—8 of FIGURE 1.

Molded within the nipple 19 and extending inward of the cylindrical wall portion 20 and upwardly from the bottom wall 21, as shown in FIGURE 8, are a plurality of fins 26, separated by their lower portions an amount equal to the width of the central opening 22, and having thereabove, inner fin faces 27 spaced sufficiently from the central axis "a" of the nipple 19 to accommodate a coiled compression spring 28, hereinafter described.

Beneath the flat top wall 14 and held in flat sealing relationship against an annular portion outward thereof by the spinning of the annular groove 17 against the underside of the rim 18, is a flat rubber-like seal 29, which may have the general configuration of a washer. To aid in its tight clamping against the dome top wall 14 the rim 18 may be equipped with a fairly sharp upper edge 30. The seal has a central cylindrical aperture 31, which seals against the cylindrical surface 37 of the valve spout 32 hereafter described. The seal aperture 31 and dome aperture 15 are held in registration so that both are concentric with the axis "a," by the spinning of the groove 17 against the nipple rim 18.

Penetrating said aperture 31 and positioned along the axis "a" is a tubular valving spout generally designated 32, of the type having an imperforate head 33 closing the inner end of the tubular spout and an axially inward-projecting guide plug portion 34 which extends inwardly of the upper coil of the spring 28, whose lower coil rests on the bases of the fins 26. The spring 28, stabilized between the guide plug portion 34 and the fins 26, urges the head 33 upward, so that its axially outer annular surface 35 (which lies outwardly of the base of the tubular spout 32 immediately above the head 33) tends to close sealingly against the axially inner side of the seal 29.

Immediately above (that is, axially outward of) the head 33, the valving spout 32 has a plurality of ports, which may be the wide-slotted, axially shallow rectangular ports 36. These extend through the wall of the spout 32 at the lower portion thereof which has a cylindrical outer surface 37. The diameter of the cylindrical outer surface portion 37 is sufficiently great, as compared with the diameter of the seal aperture 31, to result in resilient sealing of the cylindrical surface portion 37 over the entire thickness of the seal 29, which substantially exceeds the depth of the rectangular ports 36.

The cylindrical outer surface 37 is of such depth, measured upward from the annular face 35 on the head 33, that when the spout 32 is pressed downward to uncover the ports 36 to permit the outward flow, as shown in FIGURE 3, the entire thickness of the seal 29 will still bear against the cylindrical surface 37, confiining the flow so that it must pass through the ports 36 and upward through the spout. Thus in FIGURE 3, the valve of FIGURE 1 is shown pressed down to dispensing position. For this purpose there is utilized an actuator cap generally designated 38 having a central hub portion 39 which fits onto the upper spout end 40; also having a radially outward-extending nozzle 41 through which the container contents are dispensed when in use. Preferably the actuator cap 38 includes a depending skirt portion 42 which extends downward so far that when depressed to operating position, its lower edge 43 will contact the mouting cup 11 to prevent excessive downward movement. It thus limits the opening of the valve, preferably to an extent at which the rate of flow between the valve head 33 and the under surface of the seal 29 at least equals the possible rate of flow through the ports 36. In such depressed position, the entire inner surface of the seal aperture 31 will bear sealingly against part of the cylindrical outer surface 37.

Figure 7:
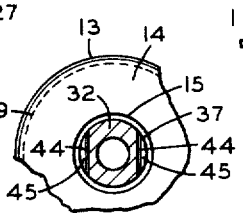
FIGURE 7 is a sectional view taken along line 7—7 of FIGURE 1.

However, the purpose of gassing quickly and without limitation as to rate of flow limitations of the rectangular ports 36, we provide for by-passing the ports, as follows:

Between the upper, or manipulative, end 40 of the spout 32 and the upper portion of the cylindrical outer surface 37, we provide an area whose cross-section is as shown in FIGURE 7; and which in vertical section is as shown in FIGURES 1 and 3, a fragmentary side elevation being shown in FIGURE 2. This portion, shown in cross-section in FIGURE 7, is of lesser cross-sectional area than the cylindrical outer surface 37, in that it possesses a pair of flats 44 molded inwardly from the cylindrical contour to serve as gas inlet by-passes as shown in FIGURE 2.

Between the cylindrical outer surface portion adjacent the valve head 33 and the level at which the cross-section of FIGURE 7 is taken, there are inward-and-upward sloping transition areas 45 on the spout surface, which afford a gradual transition and make sure that the spout, once depressed to the position shown in FIGURE 2, will not "hang up" when the spout is returned upward.

The gassing head, shown in FIGURE 2 applied over the upper end 40 of the spout, is not a portion of the present invention, therefore it is shown only schematically Gas under pressure is supplied from a source, not shown, through a conduit 46, into a hollow cast metal head 47 which may have a central inverted well 48 to receive the upper end 40 of the spout against a resilient pad 49 on the gassing head center 50. An annular sealing pad 51 is also provided on the lower face 52 of the gassing head 47, so as to effect gas-tight sealing against the top wall 14 of the dome 13.

When the gassing head 47 is applied, the pad 49 on the head center 50 presses against the upper end of the spout 40 so that the spout as a whole is forced downward to the position shown in FIGURE 2, against the urging of the spring 28. In the gassing position shown, the portion of the tubular stem having the flat 44 (which is referred to as the portion superjacent the cylindrical surface portion 37) is depressed so as to be at the level of the aperture 31 of the seal 29, preferably with the transition areas 45 lowered sufficiently below the lower surface of the seal 29 to provide adequate clearance for the rapid passage of gas. In this position, the spring is compressed nearly to shut height, and nests between the fins 26, while the gas flows between the fins 26 and through the nipple central opening 22, into the tubular portion 23, and out through the dip-tube 25, through the fluid product within the container itself, to fill the head space within the container.

If preferred, the gassing head 47 may have a tubular center 50 and a gassing orifice through the center of the pad 49, so that gas will flow through the tubular spout 32 as well as outwardly of the spout as shown in FIGURE 2. The value of such an alternative construction is not so much to increase the speed of gas flow, but rather to maintain a gas pressure inside the spout which tends to hold it depressed in part by the gas pressure, rather than merely by the physical pressure exerted through the pad 49 onto the upper edge of the spout upper end 40.

For ready dispensing at a finger's touch, such a valve should dispense with only slight pressure. On first view it might appear that a restoring spring 28 compressible with sufficient ease to permit "finger-touch" operation, would not exert a force strong enough to press the spout 32 positively and surely through a resilient seal from a smaller cross-sectional portion such as shown in FIGURE 7 to the full cross-section of the cylindrical portion 37.

We have found the answer to this problem lies in spacing the flats 44 well above the seal 29, and in providing a relatively great difference between the compressed, nearly shut height of the spring 28 when in the gassing position shown in FIGURE 2, and the valve-closed position shown in FIGURE 1; with a correspondingly great depth for the cylindrical portion 37. Eased by the slope of the transition areas 45, the spout 32 can be forced upward beyond these areas 45 by the spring resistance which exists when it is deflected to the gassing position, FIGURE 2. But spring resistance lessens as its deflection lessens. In the closed position of FIGURE 1 its deflection is relatively slight and its resistance small enough so that it will dispense at a finger touch.

Figure 4:
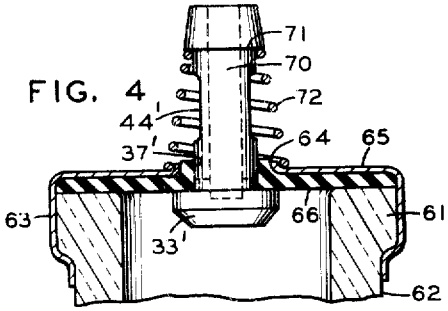
FIGURE 4 is a view, partly in section, of a modified embodiment of the invention as applied to a pressure bottle.
Figure 5:
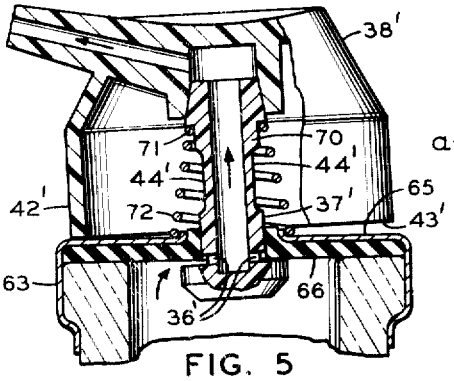
FIGURE 5 shows the valve of FIGURE 4 with an actuator cap applied and dispensing by tilting.
Figure 6:
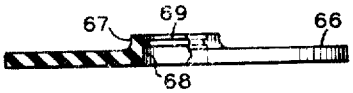
FIGURE 6 is a view, partly in section, of the molded rubber seal utilized in the valve embodiment shown in FIGURE 5.

In the construction shown in FIGURES 4 and 5, 1 apply to the mouth 61 of a bottle generally designated 62 (of which the upper end only is shown) a valve assembly which is crimped on after the fluid product is filled into the bottle, leaving a head space thereover. The assembly consists of a crimped-on metal cap 63 having a central aperture 64 in its top surface 65. Between the mouth 61 and the cap upper surface 65, and secured by crimping of the cap 63, is a rubber-like seal generally designated 66, which may be a simple washer-like seal as utilized in the preceding embodiment, or (as shown here and in detail in FIGURE 6) may be formed by molding to include an outwardly-projecting central hub portion 67 which extends upwardly within and fills the central aperture 64 of the cap 63. The seal 66 has a molded central aperture 68, having the form of a hollow cylindrical bore which extends centrally through the hub portion 67; but within this hub portion the bore 68 preferably has an internally-projecting constriction or girdle 69 so as to secure even tighter sealing engagement that would be afforded by the inner cylindrical bore portion 68 itself.

The aperture 64 of the cap and the aperture 68 of the seal are concentric, and they are penetrated by a valving spout generally designated 70, of the same general nature as has been described for the embodiment shown in FIGURES 1 to 3, save as follows: The head has no plug portion 34; instead, the upper end of the spout 40 is provided with a downward-facing shoulder 71 against which abuts the upper coil of a helical spring 72 which bears against the upper surface 65 of the cap 63. This form of valve may be utilized without a dip-tube, for dispensing an inverted position. Because of the similarity of the other parts of the valving spout, they will not here be given new numbers nor referred to in detail; instead, the numbers given to corresponding portions of the spout 32 heretofore described will be utilized with the superscript (′).

The particular form of molded seal 66, with the constricting girdle 69 projecting into the hub portion 67, is especially well suited for operation by tilting, as shown in FIGURE 5. Thus a cap 38', similar to that shown in FIGURE 3, may be used for tilting operation during which the lower edge 43' of its skirt 42' may contact the upper surface 65 of the metal cap 63 when an angle of tilt has been reached to permit the discharge of the bottle contents, under the available gas pressure, at a desired rate of flow.

It will be noted that in the embodiment shown in FIGURES 4 and 5, the angular position of the ports 36' is shown rotated 90° from the position of the ports 36, as measured from the angular position of the gassing flats 44 or 44'. This is immaterial for purposes of operation; the position chosen will be dictated by considerations of ease in molding.

It is apparent that the embodiment shown in FIGURE 4 can be gassed quickly and precisely in the same manner as shown in FIGURE 2, and heretofore described.

The quick gassing afforded by the present invention makes it possible to use valve spouts having extremely small ports and central passages, such as may be desired to restrict the flow during dispensing. Thus it makes unnecessary the "cold filling" process heretofore used, wherein the gas would be reduced in temperature to the point of liquifying or solidifying, and be inserted in the containers along with the product before the valve assembly was applied to and sealed onto the container.

Due in part to the fact that the outer peripheral edges of the seals 29, 66, shown in the two embodiments, are tightly clamped, the spouts 32, 70 may be readily manipulated, either by pressing downward or by tilting, for operation without disturbing the position of the seals beneath the mounting cup top 14 or the metal cap surface 65, respectively. The consistency of the rubber-like material which forms the seals 29, 66 may be varied; preferably a compound is utilized which, though possessing sufficient surface softness for sealing, somewhat resists distortion as a diaphragm. Thus there may be a tight sealing fit against the cylindrical surfaces 37, 37', regardless of the extent to which the spouts are depressed, whether for operation or gassing. Not only may the composition of the seals 29, 66 be varied, but also their relative thicknesses, to suit the needs of the particular valve. The necessary variations are empirical, as will be obvious to those skilled in the art.

Other modifications may be made in the construction of valves utilizing the principles of the invention herein disclosed, as well as in varying the uses to be made of such principles. Accordingly, this invention is not to be construed narrowly, but instead as fully coextensive with the claims which follow.

We claim:

1. A combined quick-gassing valve and container top for pressure dispensers, comprising a container top having an aperture, a resilient seal having a circular sealing aperture, means for securing the seal against the inner surface of the container top with the said apertures concentric, a tubular valving spout penetrating said apertures and having a head closing against the inner side of said seal and a port into the tubular spout adjacent to said head, further having an outer spout wall including a cylindrical surface outward of said port and at such level *and of such diameter greater than said circular sealing aperture* as to be sealedly embraced by the circular sealing aperture when the head is so closed, said outer spout wall having a portion superjacent to said cylindrical surface [of lesser outer extent than the inner extent of said sealing aperture,] *which includes a pair of diametrically opposite arcuate parts having the same radius as the cylindrical stem portion and flat segments alternating with said arcuate parts, whereby said superjacent stem portion is reduced in cross-section from that of the cylindrical portion,* said superjacent portion being of greater depth than the depth of the sealing aperture, whereby to permit the passage of pressurizing gas outward of said superjacent spout portion, together with a spring urging the head to closed postion, said spring being characterized by a range of axial deflectance greater than the depth of said sealing aperture.

2. A quick-gassing valve and container top as defined in claim 1, together with an inward-and-upward sloping transition area on the spout surface between the cylindrical portion and said superjacent portion.

3. A quick-gassing tubular spout valve for gas pressure dispensers, comprising a rigid tubular stem having an imperforate head, a port into the stem adjacent to and axially outward of the head, a cylindrical portion on the outer surfce of the stem axially outward of the port, and a reduced portion in the outer surface of the stem in the region axially outward of the cylindrical portion, in combination with a resilient seal against whose inner surface the head closes, the seal being of such thickness and having a circular aperture of such diameter *smaller than said cylindrical portion* as to sealedly embrace the cylindrical portion and seal off the stem port when the head is closed against the inner surface of the seal, the reduced portion in the outer surface of the stem [being smaller in cross-section than the aperture of the seal,] *including a pair of diametrically opposite arcuate parts having the same radius as the cylindrical stem portion and a pair of diametrically opposite flat segments alternating with said arcuate parts, whereby said axially outward stem portion is reduced in cross-section from that of the cylindrical portion,* the depth of said reduced portion being greater than the thickness of the seal, and a compression spring urging the stem axially outward and deflectable axially inward an amount sufficient to position the reduced stem portion spacedly within the seal aperture.

4. A quick-gassing tubular spout valve as defined in claim 3, the stem having a manipulative portion outward of the reduced portion.

5. A combined quick-gassing valve and container top for pressure dispensers, comprising the quick-gassing tubular spout valve as defined in claim 3, together with a container top having an aperture concentric with and larger than the circular aperture of the seal, the seal being mounted against the inner surface of the container top, together further with removable actuator means fitted on the stem axially outward of its reduced portion, the said actuator means having a movement-limiting edge portion presented axially inward and spaced from the outer surface of the container top a distance which, when the head is closed, is less than the thickness of the seal.

References Cited by the Examiner

The following references, cited by the Examiner, are of record in the patented file of this patent or the original patent.

UNITED STATES PATENTS

| | | | |
|---|---|---|---|
| 2,686,652 | 8/54 | Carlson et al. | |
| 2,704,622 | 3/55 | Soffer. | |
| 2,706,660 | 4/55 | Johnson et al. | |
| 2,744,665 | 5/56 | Carlson et al. | |
| 2,806,739 | 9/57 | Drell. | |
| 2,818,202 | 12/57 | Abplanalp | 239—579 X |
| 2,828,892 | 4/58 | Ward. | |
| 2,881,808 | 4/59 | St. Germain | 141—20 X |
| 2,890,817 | 6/59 | Rheinstrom. | |
| 2,968,427 | 1/61 | Meshberg. | |
| 2,998,168 | 8/61 | Waldherr. | |

RAPHAEL M. LUPO, *Primary Examiner.*